(12) United States Patent
Johnson et al.

(10) Patent No.: US 12,353,093 B2
(45) Date of Patent: *Jul. 8, 2025

(54) LIQUID CRYSTAL DISPLAY HAVING A FRONTSIDE LIGHT CONTROL FILM

(71) Applicant: 3M INNOVATIVE PROPERTIES COMPANY, St. Paul, MN (US)

(72) Inventors: Nicholas A. Johnson, Burnsville, MN (US); Encai Hao, Woodbury, MN (US); Matthew M. Philippi, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,980

(22) Filed: Apr. 25, 2023

(65) Prior Publication Data

US 2023/0266622 A1    Aug. 24, 2023

Related U.S. Application Data

(63) Continuation of application No. 17/309,492, filed as application No. PCT/IB2019/060616 on Dec. 10, 2019, now Pat. No. 11,668,977.

(60) Provisional application No. 62/779,725, filed on Dec. 14, 2018.

(51) Int. Cl.
*G02F 1/1335* (2006.01)
*G02F 1/13357* (2006.01)

(52) U.S. Cl.
CPC ......... *G02F 1/133607* (2021.01); *G02F 1/133536* (2013.01); *G02F 1/133605* (2013.01)

(58) Field of Classification Search
CPC ......... G02F 1/133607; G02F 1/133536; G02F 1/133605
USPC ................... 349/11, 16, 110–111
See application file for complete search history.

(56) References Cited

U.S. PATENT DOCUMENTS

| | | | |
|---|---|---|---|
| 3,524,789 | A | 8/1970 | Olsen |
| 6,398,370 | B1 | 6/2002 | Chiu et al. |
| 6,905,219 | B2 | 6/2005 | Gaides |
| 7,467,873 | B2 | 12/2008 | Clarke et al. |

(Continued)

FOREIGN PATENT DOCUMENTS

| | | |
|---|---|---|
| CN | 1664695 A | 9/2005 |
| CN | 101097265 B | 8/2012 |

(Continued)

OTHER PUBLICATIONS

International Search Report for PCT International Application No. PCT/IB2019/060616, mailed on Jun. 4, 2020, 3 pages.

(Continued)

*Primary Examiner* — Charles S Chang
(74) *Attorney, Agent, or Firm* — Jonathan L. Tolstedt

(57) ABSTRACT

A liquid crystal display comprises a backlight module comprising a reflective polarizing film, a light control film and a liquid crystal panel disposed between the backlight module and the light control film. The light control film comprises a light input surface and a light output surface opposite the light input surface and alternating transmissive and absorptive regions disposed between the light input surface and the light output surface. The absorptive regions have an aspect ratio of at least 30.

7 Claims, 9 Drawing Sheets

(56) References Cited

U.S. PATENT DOCUMENTS

| | | |
|---|---|---|
| 7,817,361 B2 | 10/2010 | Mimura et al. |
| 8,012,567 B2 | 9/2011 | Gaides et al. |
| 8,133,572 B2 | 3/2012 | Gaides et al. |
| 8,213,082 B2 | 7/2012 | Gaides et al. |
| 8,234,998 B2 | 8/2012 | Krogman et al. |
| 8,409,905 B2 | 4/2013 | Tanaka |
| 8,460,568 B2 | 6/2013 | David et al. |
| 8,503,122 B2 | 8/2013 | Liu et al. |
| 8,520,285 B2 | 8/2013 | Fike, III et al. |
| 8,557,378 B2 | 10/2013 | Yamanaka et al. |
| 8,657,472 B2 | 2/2014 | Aronson et al. |
| 8,888,333 B2 | 11/2014 | Yapel et al. |
| 9,063,284 B2 | 6/2015 | Jones et al. |
| 9,229,261 B2 | 1/2016 | Schwartz et al. |
| 9,335,449 B2 | 5/2016 | Gaides et al. |
| 9,618,791 B2 | 4/2017 | Haag et al. |
| 9,666,752 B2 | 5/2017 | Yamashita et al. |
| 9,804,311 B2 | 10/2017 | Gaides et al. |
| 9,960,389 B1 | 5/2018 | Hao et al. |
| 10,838,255 B2 | 11/2020 | Gahagan et al. |
| 11,668,977 B2 * | 6/2023 | Johnson ............... G02F 1/1323 349/56 |
| 2002/0159003 A1 | 10/2002 | Sato et al. |
| 2004/0233524 A1 | 11/2004 | Lippey et al. |
| 2007/0030552 A1 * | 2/2007 | Sumiyoshi ........ G02F 1/133524 359/242 |
| 2009/0087629 A1 | 4/2009 | Everaerts et al. |
| 2009/0089137 A1 | 4/2009 | Minert et al. |
| 2009/0115943 A1 * | 5/2009 | Gaides ............... B29D 11/0073 349/96 |
| 2009/0128745 A1 * | 5/2009 | Ikeda ................. G03B 21/604 359/489.07 |
| 2009/0165943 A1 | 7/2009 | Kim |
| 2010/0028564 A1 | 2/2010 | Cheng et al. |
| 2010/0040842 A1 | 2/2010 | Everaerts et al. |
| 2010/0271721 A1 * | 10/2010 | Gaides ................. G02B 5/045 359/885 |
| 2011/0126968 A1 | 6/2011 | Determan et al. |
| 2011/0217544 A1 | 9/2011 | Young et al. |
| 2014/0355125 A1 | 12/2014 | Boyd et al. |
| 2015/0276988 A1 * | 10/2015 | Cok ....................... G02B 5/003 428/195.1 |
| 2015/0293272 A1 | 10/2015 | Pham et al. |
| 2016/0124139 A1 | 5/2016 | Hattori et al. |
| 2016/0146982 A1 | 5/2016 | Boyd et al. |
| 2016/0216413 A1 | 7/2016 | Naismith et al. |
| 2019/0285937 A1 | 9/2019 | Fuchida et al. |
| 2022/0043309 A1 | 2/2022 | Johnson et al. |

FOREIGN PATENT DOCUMENTS

| | | |
|---|---|---|
| EP | 2660070 A1 | 11/2013 |
| EP | 2585861 B1 | 3/2019 |
| EP | 3258160 B1 | 1/2022 |
| JP | 2009025621 A | 2/2009 |
| JP | 2014235397 A | 12/2014 |
| JP | 2018045052 A | 3/2018 |
| WO | 2008128073 A2 | 10/2008 |
| WO | 2009052052 A1 | 4/2009 |
| WO | 2014081693 A1 | 5/2014 |
| WO | 2016077309 A2 | 5/2016 |
| WO | 2016129073 A1 | 8/2016 |
| WO | 2017100033 A1 | 6/2017 |
| WO | 2018062043 A1 | 4/2018 |
| WO | 2018130926 A1 | 7/2018 |
| WO | 2019118685 A1 | 6/2019 |
| WO | 2020026139 A1 | 2/2020 |

OTHER PUBLICATIONS

Krogman, "Automated Process for Improved Uniformity and Versatility of Layer-by-Layer Deposition", Langmuir, Mar. 13, 2007, vol. 23, No. 6, pp. 3137-3141.

* cited by examiner

LIQUID CRYSTAL DISPLAY HAVING A FRONTSIDE LIGHT CONTROL FILM

FIELD

This invention relates to liquid crystal displays comprising a light control film.

BACKGROUND

Light control films, such as louver films, are often incorporated into automotive liquid crystal displays (LCDs) to minimize reflection. Typically, the light control film is placed behind the liquid crystal (LC) panel next to or laminated directly to the rear polarizing film.

SUMMARY

Briefly, in one aspect, the present invention provides a liquid crystal display comprising (a) a backlight module comprising a reflective polarizing film; (b) a light control film comprising a light input surface and a light output surface opposite the light input surface, and alternating transmissive and absorptive regions disposed between the light input surface and the light output surface, wherein the absorptive regions have an aspect ratio of at least 30; and (c) a liquid crystal panel disposed between the backlight module and the light control film.

In another aspect, A liquid crystal display comprising (a) a backlight module; (b) a light control film comprising a light input surface and a light output surface opposite the light input surface, and alternating transmissive and absorptive regions disposed between the light input surface and the light output surface; (c) a liquid crystal panel disposed between the backlight module and the light control film; and (d) a diffuse layer laminated on the light input surface of the light control film, wherein the diffuse layer has a clarity of less than 70% and a haze of less than 60%.

Surprisingly, the LCDs of the invention, which have light control film on the "front" (i.e., viewer's side) of the LC panel, provide a significant increase in display brightness compared to LCDs of the prior art, which have light control film behind the LC panel.

DETAILED DESCRIPTION

Figure 1:
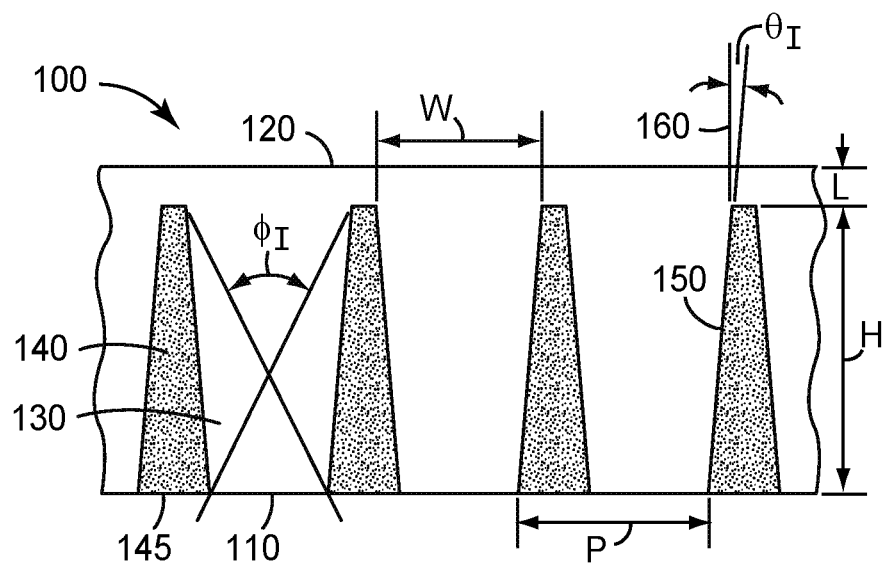
FIG. 1 is a cross-section view of a LCF.

Backlight modules provide illumination for the LCDs. The LCDs of the present invention can comprise any useful backlight module. A typical backlight module may comprise, for example, a light source, back reflector, light guide, diffuser, light collimating film(s) such as prismatic film(s) and a reflective polarizer.

The light source can be any useful light source, but in some embodiments the light source is a light emitting diode (LED). A plurality of LEDs can be arranged along an edge of the backlight module to emit light into an edge of the lightguide. The lightguide uses total internal reflection (TIR) to transport or guide light from the edge mounted LEDs across the entire length of the lightguide to the opposite edge of the backlight. A diffuser sheet can be utilized to further disperse the light. Light management films such as a reflective material disposed behind or below the lightguide, and prismatic brightness enhancement films (BEFs) and a reflective polarizing film disposed in front of or above the lightguide can be used to increase on-axis brightness.

The back reflector can be a predominately specular, diffuse or combination specular/diffuse reflector. In some embodiments, the back reflector can be a semi-specular reflector. Suitable high reflectivity materials include, for example, Enhanced Specular Reflector (ESR) multilayer polymeric film from 3M Company and white reflective films.

Prismatic BEF films, such as those available from 3M Company ensure that the light is directed toward the viewer.

The reflective polarizer recycles scattered light to increase efficiency. Any suitable reflective polarizer can be used for the reflective polarizer. For example, multilayer optical film (MOF) reflective polarizers, diffusely reflective polarizing film (DRPF) such as continuous/disperse phase polarizers, wire grid polarizers or cholesteric polarizers. MOF and continuous/disperse phase reflective polarizers rely on the difference in refractive index between at least two materials, usually polymeric materials, to selectively reflect light of one polarization state while transmitting light in an orthogonal polarization state. MOF DBEF reflective polarizers are available from 3M Company.

The LC panel typically includes a layer of LC disposed between glass plates. The glass plates can include electrode structures and alignment layers on their inner surfaces for controlling the orientation of the LCs in the LC layer. The electrode structures are commonly arranged to define LC panel pixels. A color filter may also be included with one or more of the plates. The LC structure is positioned between an upper absorbing polarizer and a lower absorbing polarizer. As used herein, references to a "liquid crystal panel" or "LC panel" include the upper absorbing polarizer and the lower absorbing polarizer (i.e., as used herein, "liquid crystal panel" or "LC panel" means liquid crystal disposed between glass plates and positioned between two absorbing polarizers).

The liquid crystal displays of the invention include a light control film ("LCF") on the frontside (i.e., the viewer's side) of the LC panel. The LC panel is disposed between the backlight module and the light control film. Useful LCFs include louver films such as those described, for example, in U.S. Pat. No. 8,503,122 (Liu et al.), U.S. Pat. No. 8,213,082 (Gaides et al.), U.S. Pat. No. 6,905,219 (Gaides), U.S. Pat. No. 8,133,572 (Gaides et al.), U.S. Pat. No. 8,012,567 (Gaides et al.), U.S. Pat. No. 9,063,284 (Jones et al.), U.S. Pat. No. 9,335,449 (Gaides et al.) and U.S. Pat. No. 9,804,311 (Gaides et al.) and co-pending publication WO 2019/118685.

LCFs are often made to ensure that the absorptive regions absorb as much of the incident light as possible. Highly absorptive regions minimize the amount of light that may "leak" through these regions, and therefore control the directionality and the function of the LCF.

The brightness of the display can be increased when incident light undergoes TIR from the interface between the absorptive and transmissive regions. Whether a light ray will undergo TIR or not, can be determined from the incidence angle with the interface, and the difference in refractive index of the materials used in the transmissive and absorptive regions.

FIG. 1 shows a cross-sectional view of an LCF 100 that includes a light output surface 120 and a light input surface 110 opposite light output surface 120. LCF 100 includes alternating transmissive regions 130, absorptive regions 140, and an interface 150 between transmissive regions 130 and absorptive regions 140. Transmissive regions 130 have a base width "W" disposed apart from each other by a pitch "P", and include a land region "L" between absorptive regions 140 and light output surface 120. Absorptive regions 140 have a base 145, a height "H" and are displaced apart from each other by pitch "P". Interface 150 forms an interface angle $\theta_1$ with a normal 160 to light output surface 120. As described herein, by "normal" to a surface is meant perpendicular to the surface. LCF 100 includes an internal viewing cutoff angle $\Phi_I$ defined by the geometry of alternating transmissive regions 130 and absorptive regions 140.

Figure 2:
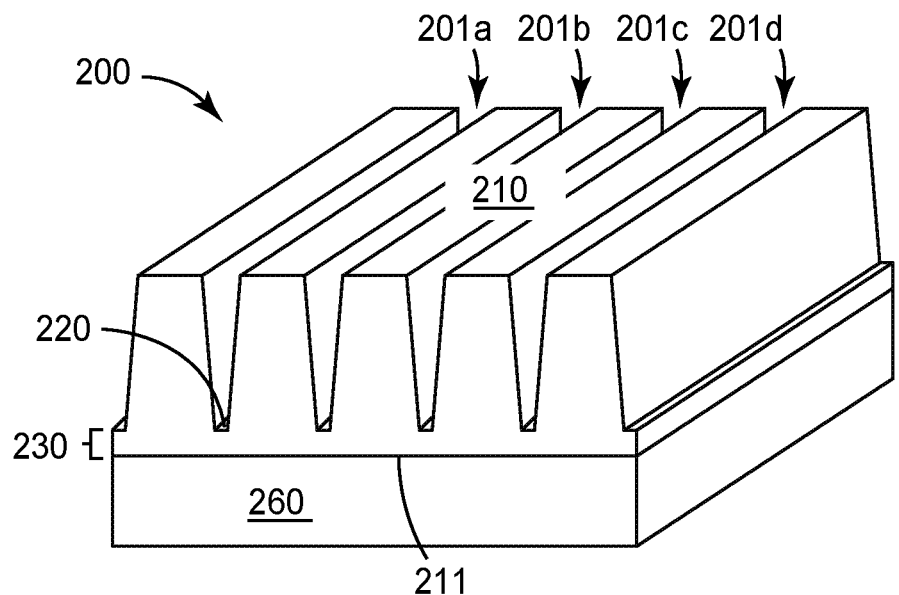
FIG. 2 is a perspective view of a microstructured film article.

FIG. 2 shows a microstructured film article 200 comprising at least one microstructured surface 210, which can be used to make an LCF. In one case, microstructured surface 210 can include a plurality of grooves 201a-201d. As shown in FIG. 2, a continuous land layer 230 can be present between the base of the grooves 220 and the opposing surface 211 of microstructured film article 200. In one case, grooves 220 can extend all the way through the microstructured film article 200. In one case, microstructured film article 200 can include a base substrate layer 260 which can be integrally formed with, or separately added to microstructured film article 200.

Figure 3:
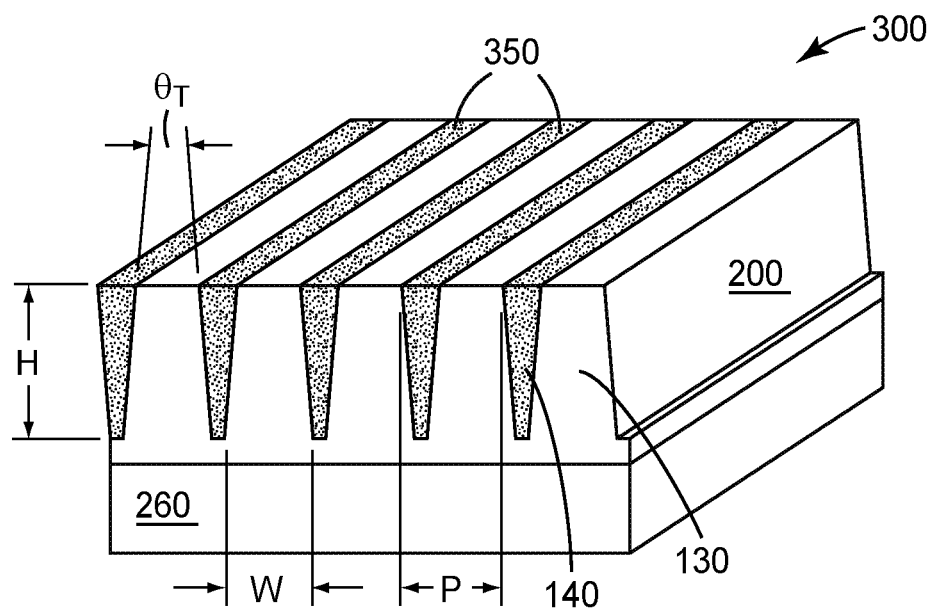
FIG. 3 is a perspective view of a LCF.

FIG. 3 shows an LCF 300 wherein grooves 201a-201d of FIG. 2 have been rendered light-absorbing by being filled with a light absorbing material 350. Light absorbing material 350 in the shape of the recess of the (e.g. groove) microstructure is herein referred to as absorptive region 140.

Figure 4:
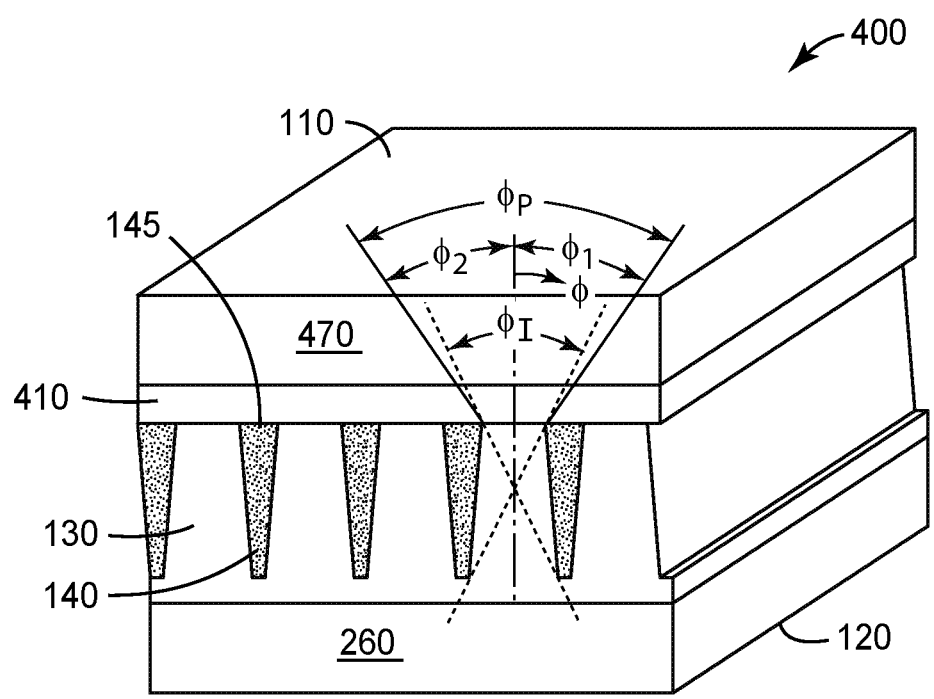
FIG. 4 is a perspective view of a LCF.

FIG. 4 shows an LCF 400 that further includes an optional cover film 470 that can be the same, or different than, base substrate layer 260. Optional cover film 470 can be bonded to the microstructured surface with an adhesive 410. Adhesive 410 can be any optically clear adhesive, such as a UV-curable acrylate adhesive, a transfer adhesive, and the like. LCF 400 also includes light input surface 110 and light output surface 120 opposite light input surface 110, defining a plane. It is to be understood that for the purposes of describing the invention herein, LCF 400 is positioned such that light input surface 110 is disposed proximate to a base 145 of absorptive region 140, however, light input surface 110 can also be disposed opposite base 145. In other words, LCF 400 can be positioned such that base 145 is closer to a light source (not shown) that injects light into light input surface 110, or it can also be positioned such that base 145 is closer to a display plane (not shown) that receives light from light output surface 120.

As shown in FIGS. 3 and 4, transmissive regions 130 between absorptive regions 140 have an included wall angle $\theta_T$, a transmissive region base width "W", an effective height "H", a pitch "P", and a polar viewing cutoff angle $\Phi_p$. Included wall angle $\theta_T$ is two times the interface angle $\theta_1$ shown in FIG. 1 for symmetric absorptive regions. In one case, interface angle $\theta_1$ can be different for each interface 150, and included wall angle $\theta_T$ is equal to the sum of the interface angles $\theta_1$ on each side of absorptive region 140, for an unsymmetrical absorptive region. Polar viewing cutoff angle $\Phi_p$ can be determined by applying Snell's law to the rays defining the internal viewing cutoff angle $\Phi_I$, using the indices of refraction of optional cover film 470, adhesive 410, transmissive regions 130, base substrate layer 260, and the material that LCF 400 is immersed in (typically air). Polar viewing cutoff angle $\Phi_p$ is equal to the sum of a polar viewing cutoff half angle $\Phi_1$ and a polar viewing cutoff half angle $\Phi_2$ each of which are measured from the normal to light input surface 110. In some cases, polar viewing cutoff angle $\Phi_p$ can be symmetric, and polar viewing cutoff half angle $\Phi_1$ is equal to polar viewing cutoff half angle $\Phi_2$. In some cases, polar viewing cutoff angle $\Phi_p$ can be asymmetric, and polar viewing cutoff half angle $\Phi_1$ is not equal to polar viewing cutoff half angle $\Phi_2$. For the purposes of this disclosure, an angle "$\Phi$" shown in FIG. 4 and measured from the normal to light input surface 110 along the direction shown, is herein referred to as a "polar viewing angle". The polar viewing angle $\Phi$ can range from 0° (i.e. normal to light input surface 110) to 90° (i.e. parallel to light input surface 110).

The material properties of transmissive regions 130, included wall angle $\theta_T$, pitch "P", and transmissive region base width "W" can impact light transmission through LCF 400. LCFs can have relatively large included wall angles, such as greater than 10 degrees or more. Larger wall angles increase the width of the light absorbing regions, thereby decreasing transmission at normal incidence. Smaller wall angles are preferred, such as less than 10 degrees, so that the transmission of light at normal incidence can be made as large as possible.

In one aspect, the present invention can be directed to LCFs where the included wall angle can be not greater than 6°. In one aspect, the included wall angle can be not greater than 5°, such as less than 5°, 4°, 3°, 2°, 1° or 0.1°. As described herein, the included wall angle can be related to the interface angle for symmetric and asymmetric absorptive regions. As such, in one aspect, the interface angle can be 3°, or not greater than 3°, for example not greater than 2.5°, 2°, 1°, or 0.1°. Smaller wall angles can form grooves having a relatively high aspect ratio (H/W) at a smaller pitch "P", and can provide a sharper image cutoff at lower viewing angles. In some cases, the transmissive regions have an average height, "H", and an average width at its widest portion, "W", and H/W is at least 1.75. In some cases, H/W is at least 2.0, 2.5, 3.0 or greater.

LCFs can be made to have any desired polar viewing cutoff angle. In one aspect, the polar viewing cutoff angle ranges from 40° to 90° or even higher. The polar viewing cutoff angle $\Phi_p$, can be determined as discussed elsewhere by the parameters "$\theta_1$", "H", "W", "P", and the indices of the LCF materials. In some cases, it can also be useful to define a "functional polar viewing angle" which includes light transmitted through the LCF at angles larger than the polar viewing cutoff angle. For example, light that intercepts the absorptive regions at angles slightly larger than the internal viewing cutoff angle $\Phi_1$ can "bleed through" the thinnest portions of the absorptive region (i.e. partially transmit through the top and bottom of the light absorbing regions represented as trapezoids shown in FIG. 1). The functional polar viewing angle can be defined as the angle at which the brightness decreases to a small percentage, for example 10%, 5% or even less, of the axial brightness.

Figure 5:
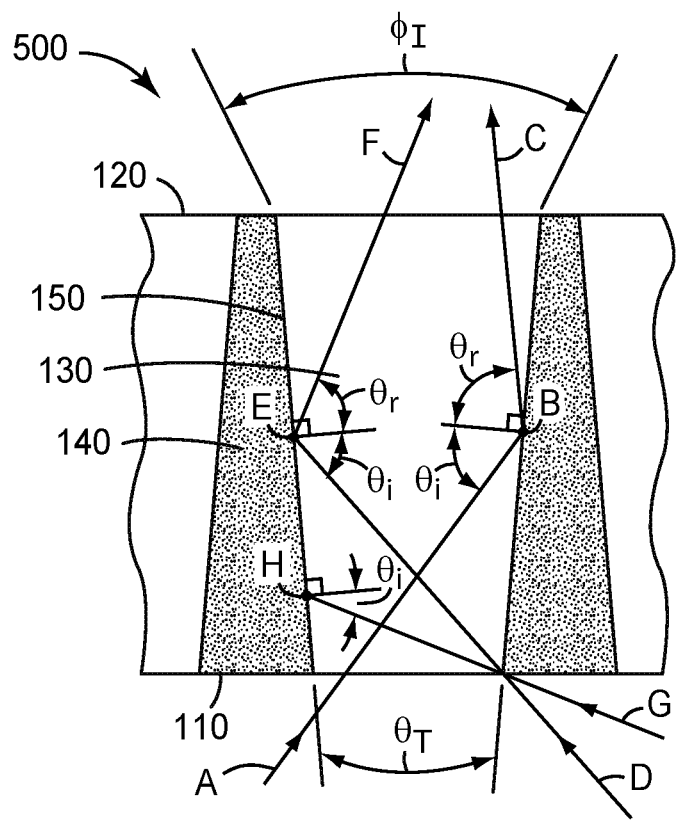
FIG. 5 is a cross-section view of a LCF.

FIG. 5 shows an LCF 500 according to one aspect of the present invention. The light transmission of LCF 500 is greater than the light transmission through prior art LCFs, since some of the light impinging on absorptive regions 140 is reflected by TIR. LCF 500 includes transmissive regions 130 comprising a material having index of refraction N1, and absorptive regions 140 comprising a material having an index of refraction N2 which is not greater than N1. The critical angle, $\theta_c$ (not shown) for the interface is $\theta_c$=arcsin (N2/N1). Light rays impinging on interface 150 at angles greater than $\theta_c$, undergo TIR at interface 150. Light rays impinging on interface 150 at angles less than $\theta_c$ are absorbed by absorptive regions 140.

FIG. 5 shows three light rays, ABC, DEF and GH which enter transmissive region 130 through light input surface 110. Light ray ABC enters transmissive region 130 within internal viewing cutoff angle $\Phi_1$, intercepts absorptive region 140 at angle of incidence $\theta_i$ greater than $\theta_c$, and undergoes TIR to exit through light output surface 120. In a similar manner, light ray DEF enters transmissive region 130 outside of internal viewing cutoff angle $\Phi_1$, intercepts absorptive region 140 at angle of incidence $\theta_i$ greater than $\theta_c$, and undergoes TIR to exit through light output surface 120. Light ray GH enters transmissive region 130 outside internal viewing cutoff angle $\Phi_1$, intercepts absorptive region 140 at angle of incidence $\theta_i$ less than $\theta_c$, and is absorbed by absorptive region 140. The included wall angle $\theta_T$, transmissive index N1, and absorptive index N2, are adjustable parameters for control of the transmission of light through light output surface 120. Selection of these parameters can cause some of the light which would otherwise be absorbed by absorptive region 140, to instead be reflected from interface 150 and directed through the output surface within the intended internal viewing cutoff angle $\Phi_1$.

Figure 6A:
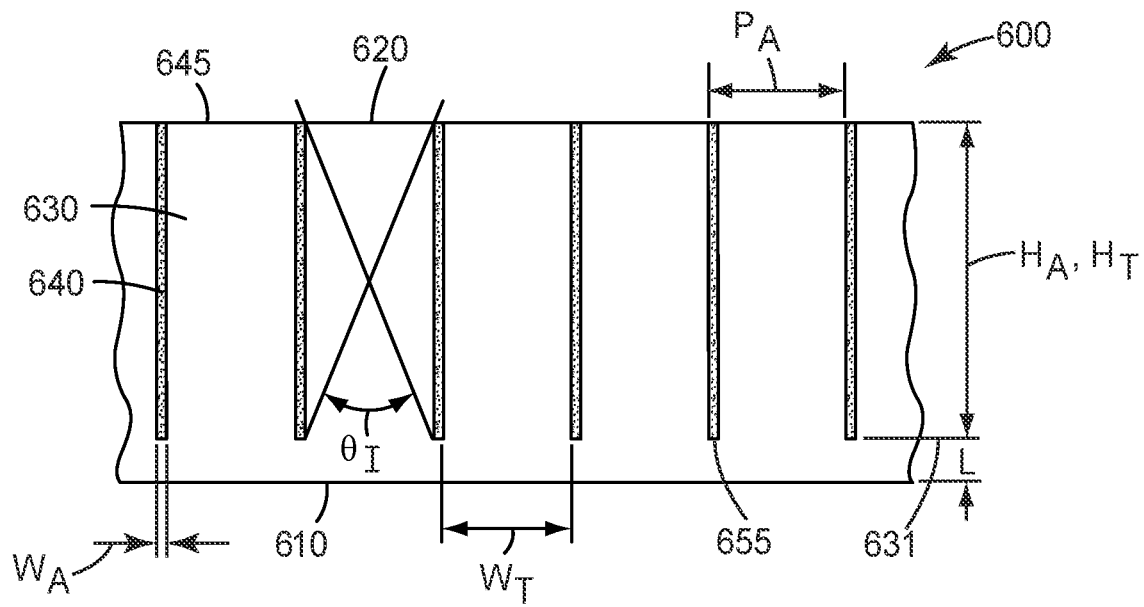
FIG. 6A is a cross-section view of a LCF.

In one useful LCF, as depicted in FIG. 6A, the transmissive regions 630 are typically integral with a land region "L", meaning that there is no interface between the land region and the base portion 631 of the transmissive regions 630. Alternatively, LCF may lack such land region L or an interface may be present between the land region, L, and transmissive regions 630. In this embodiment, the land region is disposed between the alternating transmissive regions 630 and absorptive regions 640 and light input surface 610.

Alternatively, in another embodiment, surface 620 may be the light input surface and surface 610 may be the light output surface. In this embodiment, the land region is disposed between the alternating transmissive regions 630 and absorptive regions 640 and light output surface.

The transmissive regions 630 can be defined by a width "$W_T$". Excluding the land region "L", the transmissive regions 630 typically have nominally the same height as the absorptive regions 140. In typical embodiments, the height of the absorptive regions, $H_A$, is at least 30, 40, 50, 60, 70, 80, 90 or 100 microns. In some embodiments, the height is no greater than 200, 190, 180, 170, 160, or 150 microns. In some embodiments, the height is no greater than 140, 130, 120, 110, or 100 microns. The LCF typically comprises a plurality of transmissive regions having nominally the same height and width. In some embodiments, the transmissive regions have a height, "$H_T$", a maximum width at its widest portion, "$W_T$", and an aspect ratio, $H_T/W_T$, of at least 1.75. In some embodiments, $H_T/W_T$ is at least 2.0, 2.5, 3.0, 3.5, 4.0, 4.5 or 5.0. In other embodiments, the aspect ratio of the transmissive regions is at least 6, 7, 8, 9, 10. In other embodiments, the aspect ratio of the transmissive regions is at least 15, 20, 25, 30, 35, 40, 45, or 50.

Absorptive regions 640 have a height "$H_A$" defined by the distance between the bottom surface 655 and top surface 645, such top and bottom surfaces typically being parallel to the light output surface 620 and a light input surface 610. The absorptive regions 640 have a maximum width $W_A$ and are spaced apart along surface light output surface 620 by a pitch "$P_A$".

The width of the absorptive regions, $W_A$, at the base (i.e. adjacent to bottom surface 655) is typically nominally the same as the width of the absorptive regions adjacent the top surface 645. However, when the width of the absorptive regions at the base differs from the width adjacent the top surface, the width is defined by the maximum width. The maximum width of a plurality of absorptive regions can be averaged for an area of interest, such as an area in which the transmission (e.g. brightness) is measured. The LCF typically comprises a plurality of absorptive regions having nominally the same height and width. In typical embodiments, the absorptive regions generally have a width no greater than 10, 9, 8, 7, 6, 5, 4, 3, 2, or 1 micron. In some embodiments, the absorptive regions generally have a width no greater than 900, 800, 700, 600, or 500 nanometers. In some embodiments, the absorptive regions have a width of at least 50, 60, 70, 80, 90, or 100 nanometers.

An absorptive region can be defined by an aspect ratio, the height of the absorptive region divided by the maximum width of the absorptive region ($H_A/W_A$). In some embodiments, the aspect ratio of the absorption regions is at least 1, 2, 3, 4, 5, 6, 7, 8, 9, or 10. In favored embodiments, the height and width of the absorptive region(s) are selected such that the absorptive region(s) have an even higher aspect ratio. In some embodiments, the aspect ratio of the absorption regions is at least 15, 20, 25, 30, 35, 40, 45, 50, 55, 60, 65, 70, 75, 80, 85, 90, 95 or 100. In other embodiments, the aspect ratio of the absorption regions is at least 200, 300, 400, or 500. The aspect ratio can range up to 10,000 or greater. In some embodiments, the aspect ratio is no greater than 9,000; 8,000; 7,000; 6,000; 5,000; 4,000; 3,000; 2,000, or 1,000.

Figure 6B:
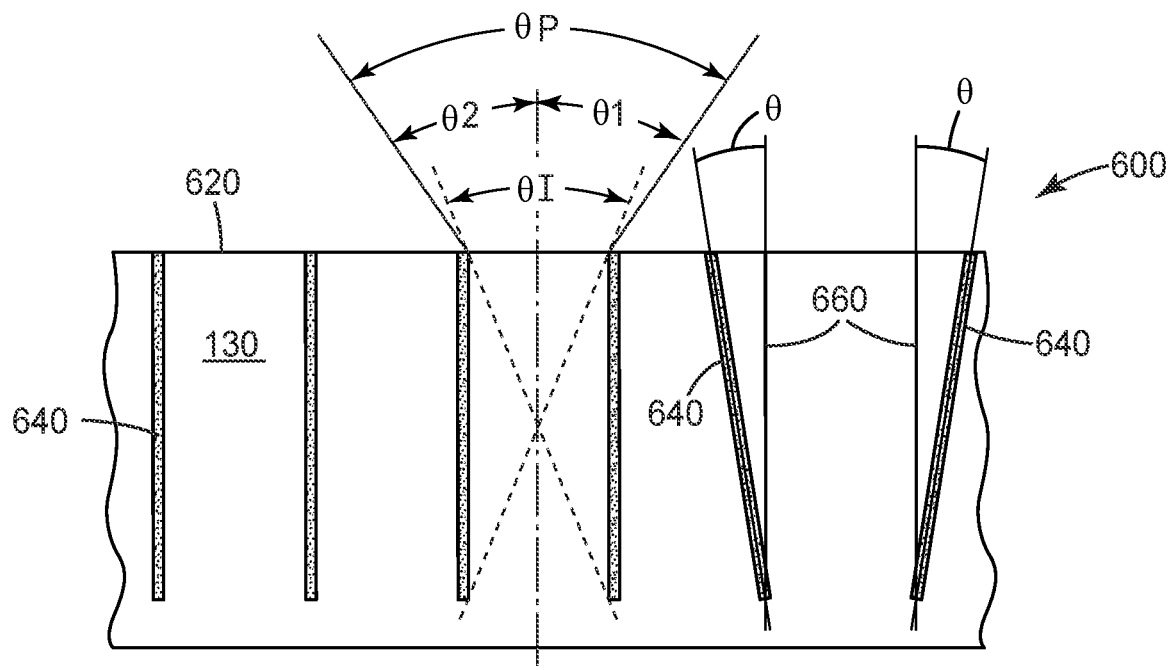
FIG. 6B depicts the polar cut-off viewing angle of the LCF of FIG. 6A.

As shown in FIG. 6B, LCF 600 includes alternating transmissive regions 630 and absorptive regions 640, and an interface 650 between transmissive regions 630 and absorptive regions 640. Interface 650 forms a wall angle θ with line 660 that is perpendicular to light output surface 620.

Larger wall angles θ decrease transmission at normal incidence or in other words a viewing angle of 0 degrees. Smaller wall angles are preferred such that the transmission of light at normal incidence can be made as large as possible. In some embodiments, the wall angle θ is less than 10, 9, 8, 7, 6, or 5 degrees. In some embodiments, the wall angle is no greater than 2.5, 2.0. 1.5, 1.0, 0.5, or 0.1 degrees. In some embodiments, the wall angle is zero or approaching zero. When the wall angle is zero, the angle between the absorptive regions and light output surface 120 is 90 degrees. Depending on the wall angle, the transmissive regions can have a rectangular or trapezoidal cross-section.

The transmission (e.g. brightness) can be increased when incident light undergoes total internal reflection (TIR) from the interface between the absorptive and transmissive regions. Whether a light ray will undergo TIR or not, can be determined from the incidence angle with the interface, and the difference in refractive index of the materials of the transmissive and absorptive regions.

Figure 7:
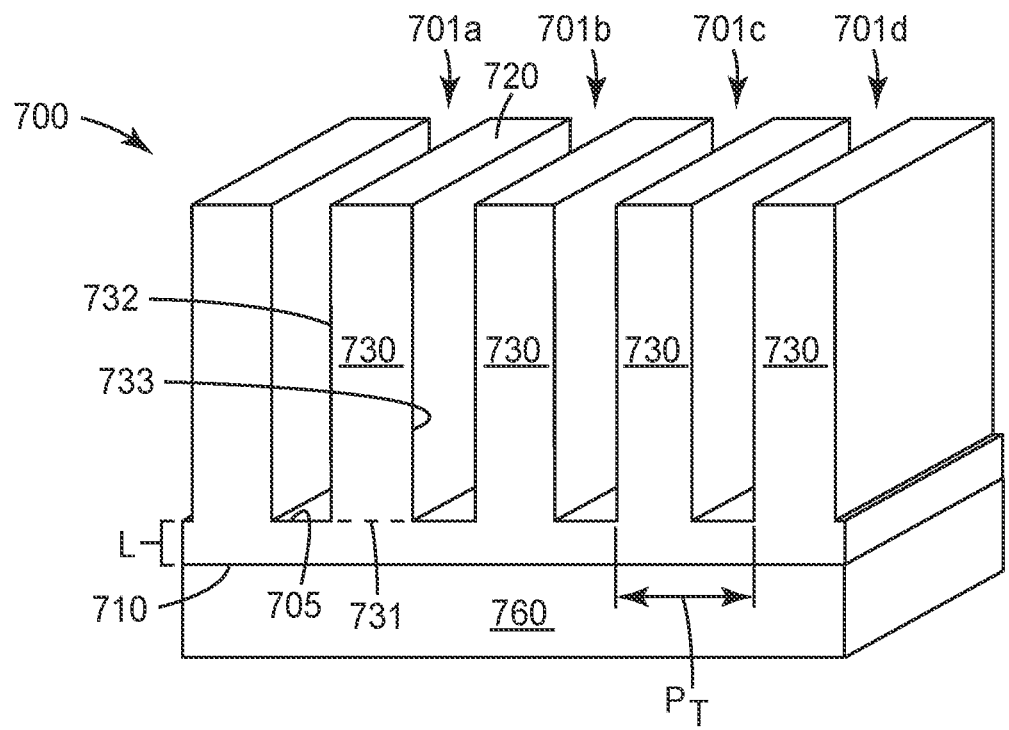
FIG. 7 is a perspective view of a microstructured film.

The absorptive regions can be formed by coating the surface of a microstructured film. FIG. 7 shows an embodied microstructured film article 700 that can be coated to make a LCF. The depicted microstructured film includes a microstructured surface 710 comprising a plurality of channels 701a-701d. As shown in FIG. 7, a continuous land layer "L"

can be present between the bottom of the channels 705 and the top surface 710 of base layer 760. Alternatively, the channels 701 can extend all the way through the microstructured film article 700. In this embodiment (not shown), the bottom surface 705 of the groove can be coincident with the top surface 710 of a base layer 760. In typical embodiments, the base layer 760 is a preformed film that comprises a different organic polymeric material than the transmissive regions 730 as will subsequently be described.

The height and width of protrusions (e.g. transmissive regions) 730 are defined by adjacent channels (e.g. 701*a* and 701*b*). The protrusions (e.g. transmissive regions) 730 relative can be defined by a top surface 770, a bottom surface, 731, and side walls 732 and 733 that join the top surface to the bottom surface. The side walls can be parallel to each other. More typically the side walls have a wall angle as previously described.

In some embodiments, the protrusions (e.g. transmissive regions) 730 have a pitch, "PT" of at least 10 microns. The pitch is the distance between the onset of a first protrusion (e.g. transmissive region) and the onset of a second protrusion (e.g. transmissive region) as depicted in FIG. 7. The pitch may be at least 15, 20, 25, 30, 35, 40, 45, or 50 microns. The pitch is generally no greater than 1 mm. The pitch is typically no greater than 900, 800, 700, 600, or 500 microns. In some embodiments, the pitch is typically no greater than 550, 500, 450, 400, 350, 300, 250 or 200 microns. In some embodiments, the pitch is no greater than 175, 150, 100 microns. In typical embodiments, the protrusions are evenly spaced, having a single pitch. Alternatively, the protrusions may be spaced such that the pitch between adjacent protrusions is not the same. In this later embodiment, at least some and typically the majority (at least 50, 60, 70, 80, 90% or greater of the total protrusions) have the pitch just described.

The pitch of the absorptive regions $P_A$ is within the same range as just described for the light transmissive regions. In some embodiments, the pitch of the transmissive regions is the same as the pitch of the light absorbing regions.

The pitch and height of the protrusions (e.g. transmissive regions) can be important to facilitate coating of the protrusions (e.g. transmissive regions) with a light absorbing coating. When the protrusions are spaced too close together it can be difficult to uniformly coat the side walls. When the protrusions are spaced too far apart, the light absorbing coating may not be effective at providing its intended function, such as privacy at off-axis viewing angles.

The absorptive regions are formed by providing a light absorptive coating on the side walls of protrusions (e.g. transmissive regions) of a microstructured film. The thickness of the light absorptive coating is equivalent to the width of the absorptive regions, $W_A$, as previously described. The absorptive regions can be formed by any method that provides a sufficiently thin, conformal, light absorptive coating on the side walls (e.g. 732, 733).

In one embodiment, the absorptive regions are formed by a combination of additive and subtractive methods.

Figure 8:
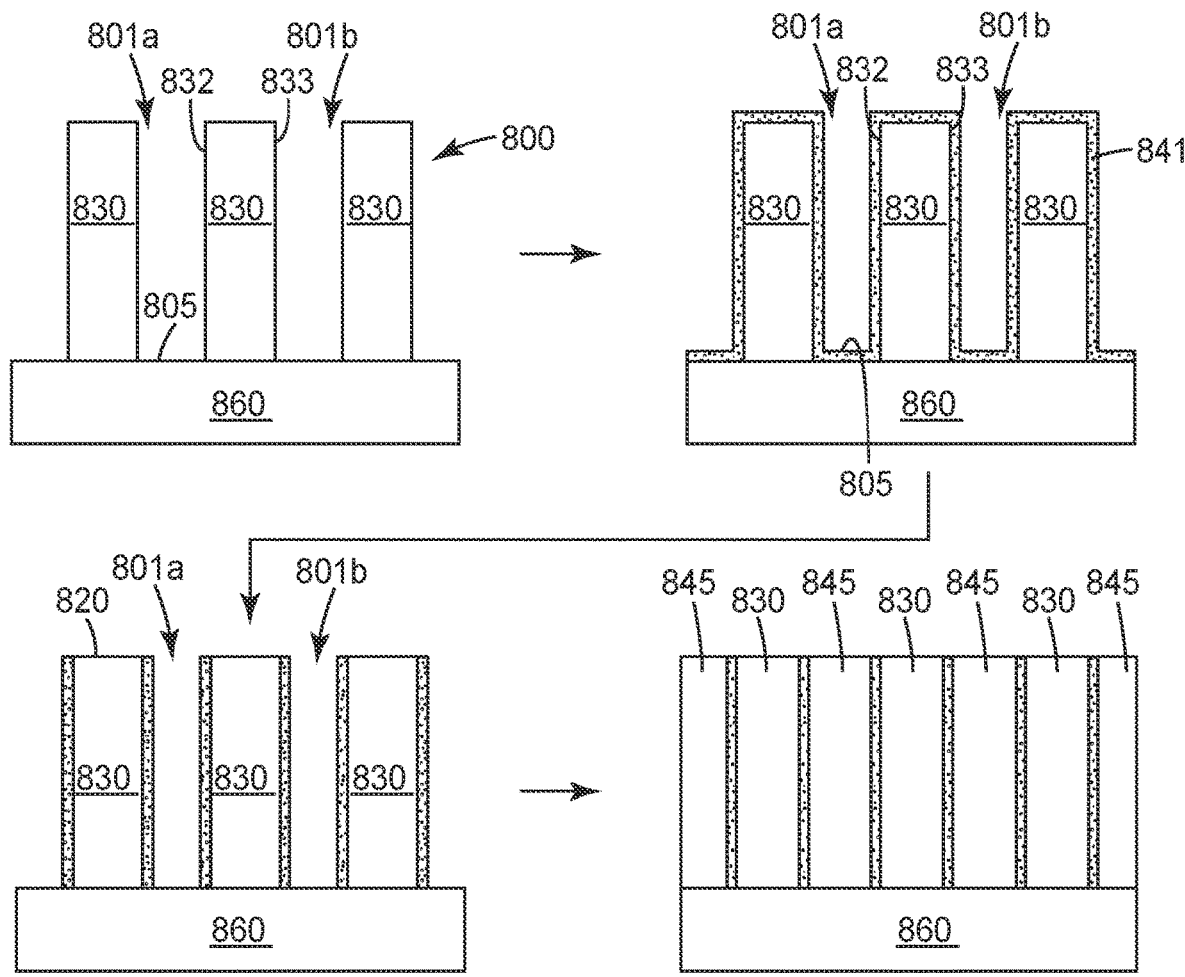
FIG. 8 is a cross-section view of a LCF further comprising a cover film bonded with an adhesive layer.

With reference to FIG. 8, the light control film can be prepared by providing a microstructured film 800 (such as the microstructured film of FIG. 7) comprising a plurality of protrusions (e.g. transmissive regions) defined by a top surface (e.g. 820) and side walls (832, 833). The plurality of protrusions (e.g. transmissive regions) 830 are separated from each other by channels 801*a* and 801*b*. The side walls of the protrusions (e.g. transmissive regions) are coincident with the side walls of the channels. The channels further comprise a bottom surface 805 that is parallel to or coincident with top surface of base layer 860. The method further comprises applying a light absorptive coating 841 to the (e.g. entire) surface of the microstructured film, i.e. the top surface 820 and side walls 832, 833 of the protrusions (e.g. transmissive regions) and the bottom surface 805 of the channels that separate the protrusions (e.g. transmissive regions). The method further comprises removing the coating from the top surface 820 of the protrusions (e.g. transmissive regions) and bottom surface 805 of the channels. In some embodiments, the method further comprises filling the channels with an organic polymeric material 845 such as (e.g. the same) polymerizable resin as the protrusions (e.g. transmissive regions) and curing the polymerizable resin. When the channels are not filled with a cured polymerizable resin, the channels are typically filled with air.

In some embodiments, the LCF has a duty cycle of 70% to 99.9% wherein the duty cycle is defined as the length of the transmissive region surface in a cross section relative to the pitch of the absorptive regions.

The LCDs of the invention can also comprise a diffuse layer disposed on the light input surface or the light output surface of the LCF. Useful diffuse layers include, for example, volumetric diffusers and surface diffusers. In some embodiments, the diffuse layer has a clarity of less than 70% (preferably less than 60%, or more preferably less than 50%); a visible light transmission of at least 85% (preferably at least 90%); and a bulk haze of less than 60% (preferably less than 50%, more preferably less than 40%, and even more preferably less than 40% or less than 30%). The clarity, transmission and haze can be measured using a Haze Gard Plus (from BYK Gardner, Columbia, MD) according to ASTM D1003-13. In some embodiments, the diffuse layer is laminated on the light input surface or the light output surface of the LCF.

The volumetric diffuser can be, e.g., a diffusing optical adhesive. Useful diffusing optical adhesives include pressure sensitive adhesives (PSAs) and structural adhesives.

One useful volumetric diffuser is the polymeric film described in U.S. Pat. No. 9,960,389 (Hao et al.). The polymeric film includes a first polymeric layer having two major surfaces, wherein the first polymeric layer comprises: a first polymeric matrix having a refractive index $n_1$; and particles having a refractive index $n_2$ uniformly dispersed within the first polymeric matrix; wherein the particles are present in an amount of less than 30 vol-%, based on the volume of the first polymeric layer, and have a particle size range of 400 nm to 3000 nm; and wherein $n_1$ is different than $n_2$.

In certain embodiments, the polymeric film includes a polymeric layer having two major surfaces, wherein the polymeric layer includes a polymeric matrix and particles (preferably, polymeric particles) uniformly dispersed within this first polymeric matrix. In certain embodiments, such polymeric film is void-free. In this context, "void-free" means that there is less than 0.5 volume percent (vol-%) pores or voids.

In certain embodiments, the polymeric film includes a second polymeric layer disposed on one major surface of the first polymeric layer, which includes polymeric matrix (i.e., first polymeric matrix) and particles. The second polymeric layer includes a second polymeric matrix. The first polymeric matrix and the second polymeric matrix may be the same or different.

The first polymeric matrix (the matrix in which the particles are dispersed) has a refractive index $n_1$, and the second polymeric matrix has a refractive index $n_3$. In certain embodiments, the first polymeric matrix and the second polymeric matrix include the same material. In certain embodiments, the first polymeric matrix is different than the second polymeric matrix.

In certain embodiments, if the first and second polymeric matrices are different, $n_1$ is at least 0.05 unit different than $n_3$. In certain embodiments, $n_1$ is within 0.2 unit of $n_3$, and in certain embodiments, $n_1$ is within 0.1 unit of $n_3$. In this context "within" means within 0.2 unit (or 0.1 unit) higher or lower.

In certain embodiments, at least one of the first polymeric matrix and the second polymeric matrix is an adhesive matrix. In certain embodiments, the first polymeric matrix and the second polymeric matrix each comprises an adhesive matrix. In certain embodiments, the first adhesive matrix and the second adhesive matrix include the same material. In certain embodiments, the first adhesive matrix is different than the second adhesive matrix.

In certain embodiments, the first (possibly only) polymeric layer of the polymeric film has a thickness of at least 10 micrometers (microns or μm). In certain embodiments, the first (possibly only) polymeric layer of the polymeric film has a thickness of up to 100 microns, or up to 50 microns, or up to 25 microns, or up to 15 microns.

In certain embodiments, the second polymeric layer of the polymeric film has a thickness of at least 25 microns. There is no maximum thickness to this second polymeric layer, although, in certain embodiments, it may be up to 1 millimeter (mm) thick.

In certain embodiments, the overall polymeric film has a thickness of at least 35 microns. In certain embodiments, the overall polymeric film has a thickness of up to 130 microns.

In some embodiments, the polymeric film has the following characteristics: a clarity of less than 70% (preferably less than 60%, or more preferably less than 50%); a visible light transmission of at least 85% (preferably at least 90%); and a bulk haze of less than 60% (preferably less than 50%, more preferably less than 40%, and even more preferably less than 40% or less than 30%).

In the current disclosure, particles, such as polymeric particles, are uniformly dispersed within a polymeric matrix. In this context, "uniformly dispersed" means a continuous randomly dispersed particle distribution throughout a polymeric matrix. Such dispersed particles are dispersed individual particles, not aggregates or agglomerations of particles. The presence of such aggregates creates highly localized haze differences that show up in a lit display as a defect known in the industry as sparkle.

In order to get uniformly dispersed particles in a polymer matrix, mixing processes and coating methods need to be controlled. For example, to effectively disperse particles in a polymer precursor (for example, curable monomers) or a polymer composition, mechanical mixing may be carried out for a period of time on the order of minutes. Alternatively, rolling of samples (dry particles added to polymer precursor or solution) may be carried out, although to get complete and homogenous particle dispersion this may have to be done for extensive periods of time (e.g., on the order of days or weeks). Thus, roller mixing is not very practical or effective, and mechanical mixing is preferred because of its efficiency and high shearing capability, which helps break up any particle agglomerates that may be present during the initial mixing.

In addition to mechanical mixing, controlled (slow) addition of the particles to the components being mechanically mixed is typically necessary to avoid agglomeration of the individual particles. Rapid addition of particles can easily form a "wet-cake-like solid" that is difficult to redisperse once formed. Slow addition can involve adding small volumes (i.e., small shots) of particles so the mixer does not get overwhelmed and a cake is not formed. Once a small shot of particles is mixed in, another shot is added. Once a cake forms, it can be difficult to break it up and get a completely uniform dispersion in a reasonable amount of time.

Thus, in certain embodiments, to effectively uniformly disperse particles in a polymer matrix, a high shear mixer (e.g., disperser disk DSFB635, manufactured by Promix, Ontario, Canada) in combination with slow addition of the particles is preferred. Typically, for the more robust polymer or inorganic beads, high shear can be used, while for softer or more fragile particles, lower but longer shear exposure is recommended.

In addition, sufficient mixing time can be used to break up particle aggregations in solution, if it occurs. Furthermore, to avoid particle settling and/or agglomeration, polymer/particle mixtures are continuously mixed, at least on a roller, until they are coated onto a substrate. In-line mixing during the coating process can be advantageously used, provided the shear/mixing time is sufficient to uniformly disperse the particles in the coating composition. In-line mixers such as those available from Quadro (Waterloo, Ontario, Canada) may be useful.

To retain uniformly dispersed particles in the final polymeric film, it is also preferred that a coating composition is coated through a precision coating method, such as slot die coating, where a relatively large gap between the die and carrier film is preferred.

The particles have a particle size range of 400 nanometers (nm) to 3000 nm, or a particle size range of 700 nm to 2.0 micrometers (microns). In this context, "particle size" refers to the longest dimension of a particle, which is the diameter of a spherical particle. A "particle size range" refers to a distribution of particle sizes from the smallest to the largest (not an average). Thus, the particles are not necessarily uniform in size. The particle size can be determined by scanning electron microscopy (SEM).

The particles may be of a variety of shapes, including polyhedron, parallelepiped, diamond, cylinder, arcuate, arcuate cylinder, rounded (e.g., oval or spherical or equi-axial), hemisphere, gumdrop, bell, cone, frusto conical cone, irregular, and mixtures thereof. In certain embodiments, the particles are spherical beads.

The polymeric film of the present disclosure includes a first polymeric layer having two major surfaces, wherein the first polymeric layer includes a first polymeric matrix and particles (preferably, polymeric particles) uniformly dispersed therein. The particles have a refractive index $n_2$ and the first polymeric matrix in which the particles are dispersed have a refractive index $n_1$, wherein $n_1$ is different than $n_2$. In certain embodiments, $n_1$ is at least 0.01 unit different than $n_2$. In certain embodiments, $n_1$ is at least 0.02 unit, or at least 0.03 unit, or at least 0.04 unit, or at least 0.05 unit different than $n_2$. In certain embodiments, $n_1$ is at most 0.5 unit different than $n_2$. In certain embodiments, $n_1$ is within 0.5 unit of $n_2$, $n_1$ is within 0.4 unit of $n_2$, $n_1$ is within 0.3 unit of $n_2$, $n_1$ is within 0.2 unit of $n_2$, or $n_1$ is within 0.1 unit of $n_2$. In this context "within" means within 0.5 unit (or 0.4 unit, or 0.3 unit, or 0.2 unit, or 0.1 unit) higher or lower.

Particles are preferably organic polymeric particles, but other particles may be used as well. Exemplary non-organic particles include $SiO_2$, $Al_2O_3$, $ZrO_2$, $ZnO$, and mixtures thereof. Exemplary organic polymers for use in the organic particles include an organic polymeric material selected from a silicone, such as a polydimethylsiloxane (PDMS), a polyurethane, a polymethyl methacrylate (PMMA), a polystyrene, or a combination thereof.

In certain embodiments, the particles are present in the first polymeric layer in an amount of less than 30 percent by volume (vol-%), based on the volume of the first polymeric layer. In certain embodiments, the particles are present in the first polymeric matrix in an amount of up to vol-%, up to 20 vol-%, or up to 15 vol-%, based on the total volume of the first polymeric layer. In certain embodiments, the particles are present in the first polymeric matrix in an amount of at least 0.5 vol-% (or at least 1 vol-%), based on the total volume of the first polymeric layer.

A wide variety of polymers may be used in the polymeric matrices of the polymeric films of the present disclosure. Exemplary polymers for use in the polymeric matrices include silicones, acrylates, polyurethanes, polyesters, and polyolefins.

In certain embodiments, the polymeric matrices can be selected from a single-phase polymer matrix or a polymer matrix having a multiphase morphology. The multiphase morphology may be inherent in the choice of polymer matrix, such as for example, in a semi-crystalline polymer having both amorphous and crystalline domains, or may result from a polymer blend. Alternatively, the multiphase morphology may develop during drying or curing of the polymer matrix. Useful polymer matrices having multiphase morphology include those where each of the phases has the same refractive index or those where the refractive index is mismatched but the domain size of the dispersed phase does not exceed the size of the particles dispersed in the polymer matrix.

In certain embodiments, the polymeric matrices are adhesive matrices. In certain embodiments, at least one adhesive matrix includes an optically clear adhesive (OCA). In certain embodiments, the optically clear adhesive is selected from an acrylate, a polyurethane, a polyolefin (such as a polyisobutylene (PIB)), a silicone, or a combination thereof. Illustrative OCAs include those described in International Pub. No. WO 2008/128073 (3M Innovative Property Co.) relating to antistatic optically clear pressure sensitive adhesives, U.S. Pat. App. Pub. Nos. US 2009/089137 (Sherman et al.) relating to stretch releasing OCA, US 2009/0087629 (Everaerts et al.) relating to indium tin oxide compatible OCA, US 2010/0028564 (Cheng et al.) relating to antistatic optical constructions having optically transmissive adhesive, US 2010/0040842 (Everaerts et al.) relating to adhesives compatible with corrosion sensitive layers, US 2011/0126968 (Dolezal et al.) relating to optically clear stretch release adhesive tape, and U.S. Pat. No. 8,557,378 (Yamanaka et al.) relating to stretch release adhesive tapes. Suitable OCAs include acrylic optically clear pressure sensitive adhesives such as, for example, 3M OCA 8146 available from 3M Company, St. Paul, MN.

For dual layer embodiments, the polymeric layers may be the same material or they may be composed of two different materials. In either case, each polymeric layer may include a single-phase polymer matrix or may include a polymer matrix having a multiphase morphology.

In certain embodiments, a dual layer product construction may include one layer having particular optically diffusing properties and a second layer being an optically clear adhesive.

Surface diffusers have a structured surface to provide light diffusion. Useful surface diffusers include, for example, structured surfaces disclosed in US Patent Application Pub. Nos. US 2015/0293272 (Pham et al.) and US 2016/0146982 (Boyd et al.). The films can be made by fabricating a tool having a structured surface, and microreplicating the structured surface as a major surface of the optical film. Fabrication of the tool can involve electrodepositing a first layer of a metal under conditions that produce a first major surface with a relatively high average roughness, followed by covering up the first layer by electrodepositing a second layer of the same metal on the first layer, under conditions that produce a second major surface with a relatively lower average roughness, i.e., lower than that of the first major surface. The second major surface has a structured topography which, when replicated to form a structured major surface of an optical film, provides the film with a desired combination of optical haze and optical clarity, along with other characteristics related to the topography of the structured surface that can be advantageous.

The structured major surface of the optical film provides the film with a desired amount of optical haze and optical clarity. The structured major surface also preferably has physical properties that avoid or diminish one or more of the artifacts mentioned above. For example, the topography of the structured surface may possess a degree of irregularity or randomness in surface profile characterized by an ultra-low periodicity, i.e., a substantial absence of any significant periodicity peaks in a Fourier spectrum as a function of spatial frequency along each of a first and second orthogonal in-plane direction. Furthermore, the structured surface may comprise discernible structures, e.g. in the form of distinct cavities and/or protrusions, and the structures may be limited in size along two orthogonal in-plane directions. The size of a given structure may be expressed in terms of an equivalent circular diameter (ECD) in plan view, and the structures may have an average ECD of less than 15 microns, or less than 10 microns, or in a range from 4 to microns, for example. In some cases, the structures may have a bimodal distribution of larger structures in combination with smaller structures. The structures may be closely packed and irregularly or non-uniformly dispersed. In some cases, some, most, or substantially all of the structures may be curved or comprise a rounded or otherwise curved base surface. In some cases, some of the structures may be pyramidal in shape or otherwise defined by substantially flat facets. The structures can in at least some cases be characterized by an aspect ratio of the depth or height of the structures divided by a characteristic transverse dimension, e.g. the ECD, of the structures. The structured surface may comprise ridges, which may for example be formed at the junctions of adjacent closely-packed structures. In such cases, a plan view of the structured surface (or of a representative portion thereof) may be characterized in terms of the total ridge length per unit area. The optical haze, optical clarity, and other characteristics of the optical diffusing films can be provided without the use of any beads at or on the structured surface, or elsewhere within the optical film.

Other useful diffusing films include randomly-distributed prismatic structures such as those described, for example, in WO 2018/130926 (Derks et al.). The microstructured surface includes an irregular distribution of a plurality of prismatic structures that include a plurality of facets angled from a reference plane of the microstructured surface. While the prismatic structures may be individually irregular or random, the facets of the prismatic structures may be sized, angled, and distributed such that the surface azimuthal distribution of facets may be substantially uniform along the reference plane, while the surface polar distribution of facets may fall substantially within a polar range that correlates with a peak transmission of light normally incident to the reference plane. This distribution of facets may result in optical distribution properties of the microstructured surface that approximate conical optical distribution properties, such as the optical distribution properties of an ensemble of conical prismatic structures having an equivalent distribution of base angles, while covering substantially the entire major surface with prismatic structures. The use of interconnected facet surfaces may enable substantially the entire surface of the optical film to be covered by the microstructured surface. The irregular distribution of the prismatic structures may reduce moiré effects that appear in patterned or regular films.

Other examples of useful microreplicated films are described in U.S. Pat. No. 8,657,472 (Aronson et al.), U.S. Pat. No. 8,888,333 (Yapel et al.), and U.S. Pat. No. 9,618,791 (Haag et al.) and U.S. Patent Application Pub. Nos. US 2014/0355125 (Boyd et al.) and US 2016/0216413 (Naismith et al.).

In some embodiments, the surface diffuser may be embedded in a material having a lower refractive index than the refractive index of the surface diffuser material.

Figure 9:
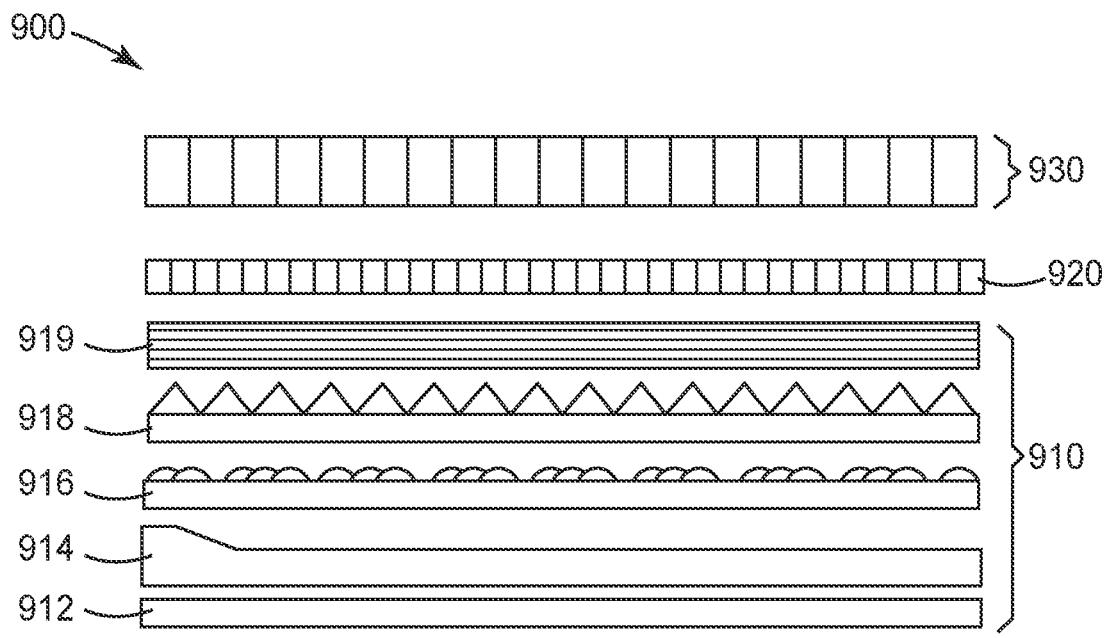
FIG. 9 is a cross-section view of a LCD of the prior art.

The LCDs of the invention are particularly useful as automotive displays. Typically, in automotive LCDs, a LCF is incorporated in the backlight module design for the collimation of light. FIG. 9 shows a cross-sectional schematic of a LCD of the prior art. LCD 900 includes backlight module 910, LCF 920 and LC panel 930. Backlight module 910 includes reflector 912, light guide 914, diffuser 916, prism film 918 and reflective polarizer 919. LCF 920 is located between reflective polarizer 919 and LC panel 930, thus LCF 920 is between the LC panel absorbing polarizer and the reflective polarizer.

Figure 10:
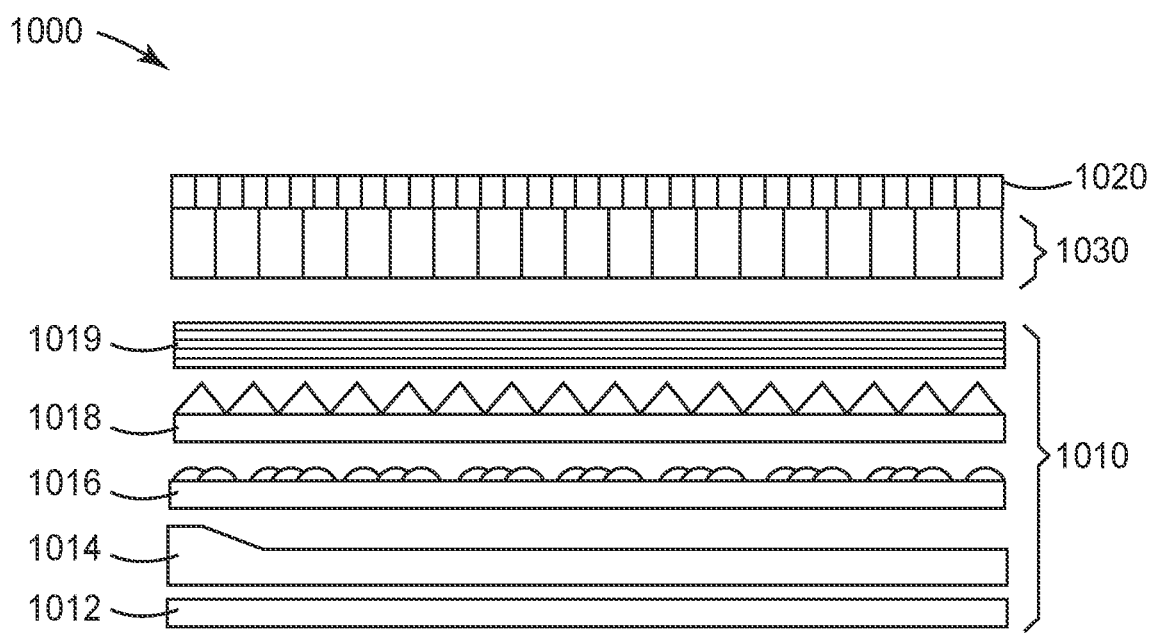
FIG. 10 is a cross-section view of a LCD of the invention.

It has been discovered that disposing the LCF on the frontside or view side of the LC panel results in a significant increase in brightness of the LCD. FIG. 10 shows a cross-sectional schematic of an embodiment of an LCD of the invention. LCD 1000 includes backlight module 1010, LCF 1020 and LC panel 1030. LCF 1020 is located on top of LC panel 1030, thus LCF 1020 is no longer between the LC panel absorbing polarizer and the reflective polarizer. LCF 1020 may be stacked on LC panel 1030 or laminated on LC panel 1030.

Figure 11:
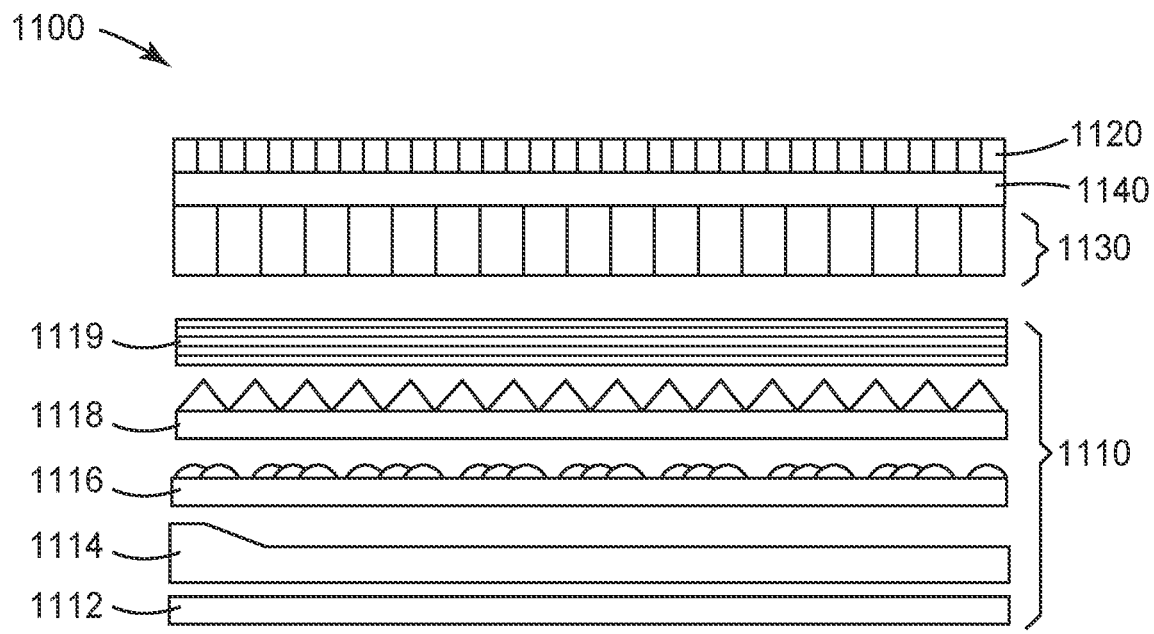
FIG. 11 is a cross-section view of a LCD of the invention.

FIG. 11 illustrates another embodiment of an LCD of the invention. LCD 1100 includes backlight module 1110, LCF 1120, LC panel 1130 and diffuse layer 1140. LCF 1120 is located on top of LC panel 1130 with diffuse layer 1140 between LC panel 1130 and LCF 1120.

Figure 12:
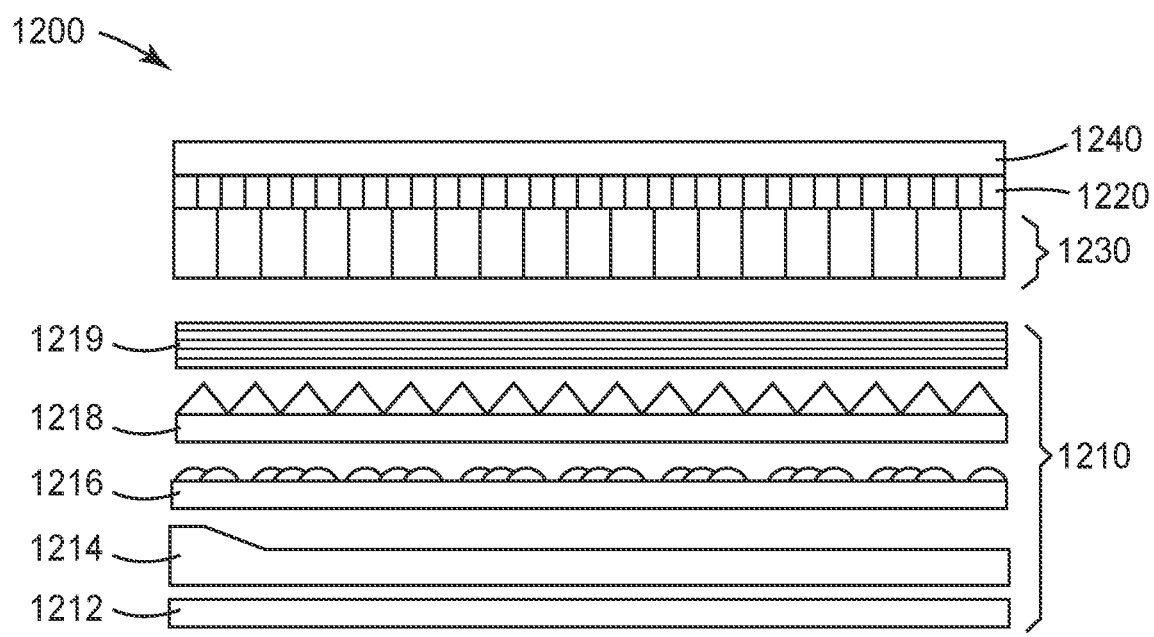
FIG. 12 is a cross-section view of a LCD of the invention.

FIG. 12 illustrates another embodiment of an LCD of the invention. LCD 1200 includes backlight module 1210, LCF 1220, LC panel 1230 and diffuse layer 1240. LCF 1220 is located on top of LC panel 1230 with diffuse layer 1240 on the frontside of LCF 1220.

EXAMPLES

Objects and advantages of this invention are further illustrated by the following examples, but the particular materials and amounts thereof recited in these examples, as well as other conditions and details, should not be construed to unduly limit this invention.

Unless otherwise noted, all parts, percentages, ratios, etc., in the examples and in the remainder of the specification are by weight. Unless otherwise noted, all chemicals were obtained from, or are available from, chemical suppliers such as Sigma-Aldrich Co., St. Louis, Missouri Materials The following is a list of materials used throughout the Examples, as well as their brief descriptions and origins.

The components of Resin A used in the cast-and-cure microreplication process (Preparative Example 1) as well as the index-matched backfill material in examples are listed in Table 1 below. The raw materials for the layer-by-layer coating are listed in Table 2 below. The raw materials for reactive ion etching are listed in Table 3 below. The raw materials for the diffuse adhesive preparation are listed in Table 4 below.

TABLE 1

Raw materials for Resin A

| Material | Abbreviation | Commercial source |
|---|---|---|
| Aliphatic urethane diacrylate Viscosity 5900 mPa · s at 60° C. Tensile Strength 2060 psi Tg = −7° C. | Photomer 6010 | BASF |
| Ethoxylated (10) bisphenol A diacrylate | SR602 | Sartomer (Exton, PA) |
| Ethoxylated (4) bisphenol A diacrylate | SR601 | Sartomer (Exton, PA) |
| Trimethylolpropane triacrylate | TMPTA | Cytec Industries (Woodland Park, NJ) |
| Phenoxyethyl Acrylate | PEA (Etermer 2010) | Eternal Chemical Co., Ltd., Kaohsiung, Taiwan |
| 2-Hydroxy-2-methylpropiophenone photoinitiator | Darocur 1173 | BASF Corporation (Florham Park, New Jersey) |
| Diphenyl(2,4,6-trimethylbenzoyl)phosphine oxide photoinitiator | TPO | BASF Corporation (Florham Park, New Jersey) |
| Irgacure 1035 anti-oxidant | I1035 | BASF Corporation (Florham Park, New Jersey) |

TABLE 2

Raw materials for the layer-by-layer coatings

| Material | Abbreviation | Commercial source |
|---|---|---|
| Poly(diallyl-dimethyl ammonium chloride), molecular weight 100-200K | PDAC | Sigma-Aldrich Co. (St. Louis, Missouri) |
| Polyethylenimine, molecular weight 25K | PEI | Sigma-Aldrich Co. (St. Louis, Missouri) |

TABLE 2-continued

Raw materials for the layer-by-layer coatings

| Material | Abbreviation | Commercial source |
|---|---|---|
| Polyacrylic acid, molecular weight 100K, Accumer ™ 1510 | PAA | Dow Chemical Company (Midland, Michigan) |
| CAB-O-JET ® 200 carbon black nano-pigment, 130 nm diameter, sulfonate functionalized | COJ200 | Cabot Corporation (Boston, Massachusetts) |
| CAB-O-JET ® 250C cyan nano-pigment, 91 nm diameter, sulfonate functionalized | COJ250C | Cabot Corporation (Boston, Massachusetts) |
| CAB-O-JET ® 260M magenta nano-pigment, 105 nm diameter, sulfonate functionalized | COJ260M | Cabot Corporation (Boston, Massachusetts) |
| CAB-O-JET ® 352K carbon black nano-pigment, 70-80 nm diameter, carboxylate functionalized | COJ352K | Cabot Corporation (Boston, Massachusetts) |
| Sodium chloride | NaCl | Sigma-Aldrich Co. (St. Louis, Missouri) |
| Sodium hydroxide (1M in water) | NaOH | Avantor Performance Materials (Central Valley, PA) |

TABLE 3

Raw materials for reactive ion etching

| Material | Abbreviation | Commercial source |
|---|---|---|
| Oxygen (UHP compressed gas) | $O_2$ | Oxygen Service Company (St Paul, Minnesota) |
| Argon (UHP compressed gas) | Ar | Oxygen Service Company (St Paul, Minnesota) |

TABLE 4

Raw materials for diffuse adhesive preparation

| Designation | Description | Commercial source |
|---|---|---|
| ACM | Acrylamide | Parchem, New Rochelle, NY |
| EHA | 2-Ethylhexyl acrylate | BASF, Florham Park, NJ |
| EHMA | 2-Ethylhexyl Methacrylate | BASF, Florham Park, NJ |
| HEA | 2-Hydroxyethyl acrylate | BASF, Florham Park, NJ |
| HDDA | 1,6-Hexandiol diacrylate | BASF, Florham Park, NJ |
| KBM-403 | 3-Glycidoxypropyl trimethoxysilane | Shin-Etsu silicones of America, INC, Akron, Ohio |
| RF02N | Silicone coated polyester release liner | SKC Haas (Cheonan, Korea) |
| RF22N | Silicone coater polyester release liner | SKC Haas (Cheonan, Korea) |
| MX-1000 | PMMA beads | Soken Chemical and Engineering Co., Tokyo, Japan. |
| IRGACURE 651 | Alpha,alpha-dimethoxy-alpha-phenylacetophenone | BASF, Florham Park, NJ |

Preparative Example 1 (PE1): Preparation of "Square Wave" Microstructured Film

A diamond (29.0 µm tip width, 3° included angle, 87 µm deep) was used to cut a tool having a plurality of parallel linear grooves. The grooves were spaced apart by a pitch of 62.6 microns.

Resin A was prepared by mixing the materials in Table 5 below.

TABLE 5

Composition of Resin A used to make microstructured film

| Material | Parts by Weight |
|---|---|
| Photomer 6010 | 60 |
| SR602 | 20 |
| SR601 | 4.0 |
| TMPTA | 8.0 |
| PEA (Etermer 2010) | 8.0 |
| Darocur 1173 | 0.35 |
| TPO | 0.10 |
| I1035 | 0.20 |

A "cast-and-cure" microreplication process was carried out with Resin A and the tool described above. The line conditions were: resin temperature 150° F., die temperature 150° F., coater IR 120° F. edges/130° F. center, tool temperature 100° F., and line speed 70 fpm, Fusion D lamps, with peak wavelength at 385 nm, were used for curing and operated at 100% power. The resulting microstructured film comprised a plurality of protrusions (e.g. light transmissive regions) separated by channels as illustrated in FIG. 8. The protrusions of the microstructured film are a negative replication of the grooves of the tool. The protrusions have a wall angle of 1.5 degrees resulting in the protrusions being slightly tapered (wider at the light input surface and narrower at the light output surface). The channels of the microstructured film are a negative replication of the uncut portions of the tool between the grooves.

Method for Making Layer-by-Layer Self-Assembled Coatings on Microstructured Film Layer-by-layer self-assembled coatings were made using an apparatus purchased from Svaya Nanotechnologies, Inc. (Sunnyvale, CA) and modeled after the system described in U.S. Pat. No. 8,234,998 (Krogman et al.) as well as Krogman et al. *Automated Process for Improved Uniformity and Versatility of Layer-by-Layer Deposition, Langmuir* 2007, 23, 3137-3141.

The apparatus comprises pressure vessels loaded with the coating solutions. Spray nozzles with a flat spray pattern (from Spraying Systems, Inc., Wheaton, Illinois) were mounted to spray the coating solutions and rinse water at specified times, controlled by solenoid valves. The pressure vessels (Alloy Products Corp., Waukesha, WI) containing the coating solutions were pressurized with nitrogen to 30 psi, while the pressure vessel containing deionized (DI) water was pressurized with air to 30 psi. Flow rates from the coating solution nozzles were each 10 gallons per hour, while flow rate from the DI water rinse nozzles were 40 gallons per hour. The substrate to be coated was adhered with epoxy (Scotch-Weld epoxy adhesive, DP100 Clear, 3M Company, St. Paul, MN) to a glass plate (12"×12"×⅛" thick) (Brin Northwestern Glass Co., Minneapolis, MN), which was mounted on a vertical translation stage and held in place with a vacuum chuck. In a typical coating sequence, the polycation (e.g., PDAC) solution was sprayed onto the substrate while the stage moved vertically downward at 76 mm/sec. Next, after a dwell time of 12 sec, the DI water solution was sprayed onto the substrate while the stage moved vertically upward at 102 mm/sec. The substrate was then dried with an airknife at a speed of 3 mm/sec. Next, the polyanion (e.g., pigment nanoparticles) solution was sprayed onto the substrate while the stage moved vertically downward at 76 mm/sec. Another dwell period of 12 sec was allowed to elapse. The DI water solution was sprayed onto the substrate while the stage moved vertically upward at 102 mm/sec. Finally, the substrate was then dried with an airknife at a speed of 3 mm/sec. The above sequence was repeated to deposit a number of "bi-layers" denoted as (Polycation/Polyanion)$_n$ where n is the number of bi-layers.

Method for Reactive Ion Etching Microstructured Film

Reactive ion etching (RIE) was performed in a parallel plate capacitively coupled plasma reactor. The chamber has a central cylindrical powered electrode with a surface area of 18.3 ft$^2$. After placing the microstructured film on the powered electrode, the reactor chamber was pumped down to a base pressure of less than 1.3 Pa (2 mTorr). A mixture of Ar (argon) and O$_2$ (oxygen) gas was flowed into the chamber, each at a rate of 100 SCCM. Treatment was carried out using a plasma enhanced CVD method by coupling RF power into the reactor at a frequency of 13.56 MHz and an applied power of 6000 watts. Treatment time was controlled by moving the microstructured film through the reaction zone. Following the treatment, the RF power and the gas supply were stopped and the chamber was returned to atmospheric pressure. Additional information regarding materials, processes for applying cylindrical RIE, and further details around the reactor used can be found in U.S. Pat. No. 8,460,568 B2.

Method for Back-Filling Channels of the Microstructured Film

The channels were back-filled with Resin A used in PE1 by pipetting the resin between the microstructured film surface and a piece of unprimed, 2 mil-thick PET film placed on top, using a hand roller to apply pressure to the top PET film, and then UV curing with a Heraeus (Hanau, Germany) belt conveyer UV processor (Model #DRS(6)) with an 'H' bulb at 500 Watt power. Specifically, the samples were sent through the UV curing station three times at a conveyer speed of 50 ft/min. Next, the top PET film was stripped off the microstructured film by hand.

Preparation of Diffuse Adhesive

The diffusive pressure sensitive adhesive formulation was prepared as follows: A monomer premix was prepared by first dissolving acrylamide (3 part) in HEA (14 parts), then add EHA (65 parts), EHMA (18 parts), and 0.15 part of Irgacure 651. The mixture was partially polymerized under a nitrogen (inert) atmosphere by exposure to ultraviolet radiation generated by an ultraviolet light emitting diode (UVA-LED) to provide a coatable syrup having a viscosity of about 1000 centipoise (cps). Then HDDA (0.24 part), IRGACURE 651 (0.18 part), and KBM-403 (0.05 part) were added to the syrup to form a homogenous adhesive coating solution. Finally, MX-1000 polymer beads was added to the adhesive solution in a ratio of 1:9 by weight under rapidly stirring using an overhead Jiffy LM Pint mixer (manufactured by Jiffy Mixer Co. Inc, Corona, CA) for 2 hours, and the milky white adhesive coating solution was placed on a mixing roller for additional 3 days before coating.

The diffusive PSA was prepared by knife-coating the corresponding formulation between two silicone-treated release liners at a thickness of 75 microns. The resulting coated material was then exposed to low intensity ultraviolet radiation (a total energy of 1 Joule per square centimeter (J/cm$^2$)) having a spectral output from 300-400 nm with a maximum at 351 nm.

Test Method for Measuring the Luminance Profile from a Diffuse Light Source

An Eldim L80 conoscope (Eldim S. A., HEROUVILLE SAINT CLAIR, France) was used to detect light output in a hemispheric fashion at all polar and azimuthal angles simultaneously. After detection, a cross section of luminance (e.g. brightness) readings were taken in a direction orthogonal to the direction of the louvers (denoted as a 0° orientation angle), unless indicated otherwise. A 12.3" 1920×720 LCD backlight with 3M BEF3-t-155n prism film placed above the bottom diffuser and 3M ARP-320 placed above the prism film to create a traditional film stack. The backlight was held at the same power level for all measurements.

Example Descriptions

Square Wave films were prepared as described above in Preparatory Example 1 on both Poly(ethylene terephthalate) (PET) and Polycarbonate (PC) substrates. The same substrate material was then laminated on the other side to encapsulate the construction. The louver film types are hereafter labelled as either PET type or PC type louver films.

Examples are constructed from two louver types (PC and PET) and in two configurations (laminated onto LCD panel and in resting contact with LCD panel) to form four examples. FIG. 10 shows sample configuration where louver film placed in contact with LCD panel. FIG. 11 shows sample configuration where louver film is laminated onto LCD panel. FIG. 9 shows comparative sample configuration wherein louver film is placed between backlight unit and LCD panel. Example 1 is composed of PET louver film type in resting contact with the LCD panel. Example 2 is composed of PET louver film type laminated to LCD panel using diffusive adhesive. Example 3 is composed of PC louver type film resting in contact with the LCD panel. Example 4 is composed of PC louver film type laminated to LCD panel using diffusive adhesive. Comparative example 1 is composed of PET louver film placed between backlight unit and LCD panel. Comparative example 2 is composed of PC louver film placed between backlight unit and LCD panel.

Measurements Results

Figure 13:
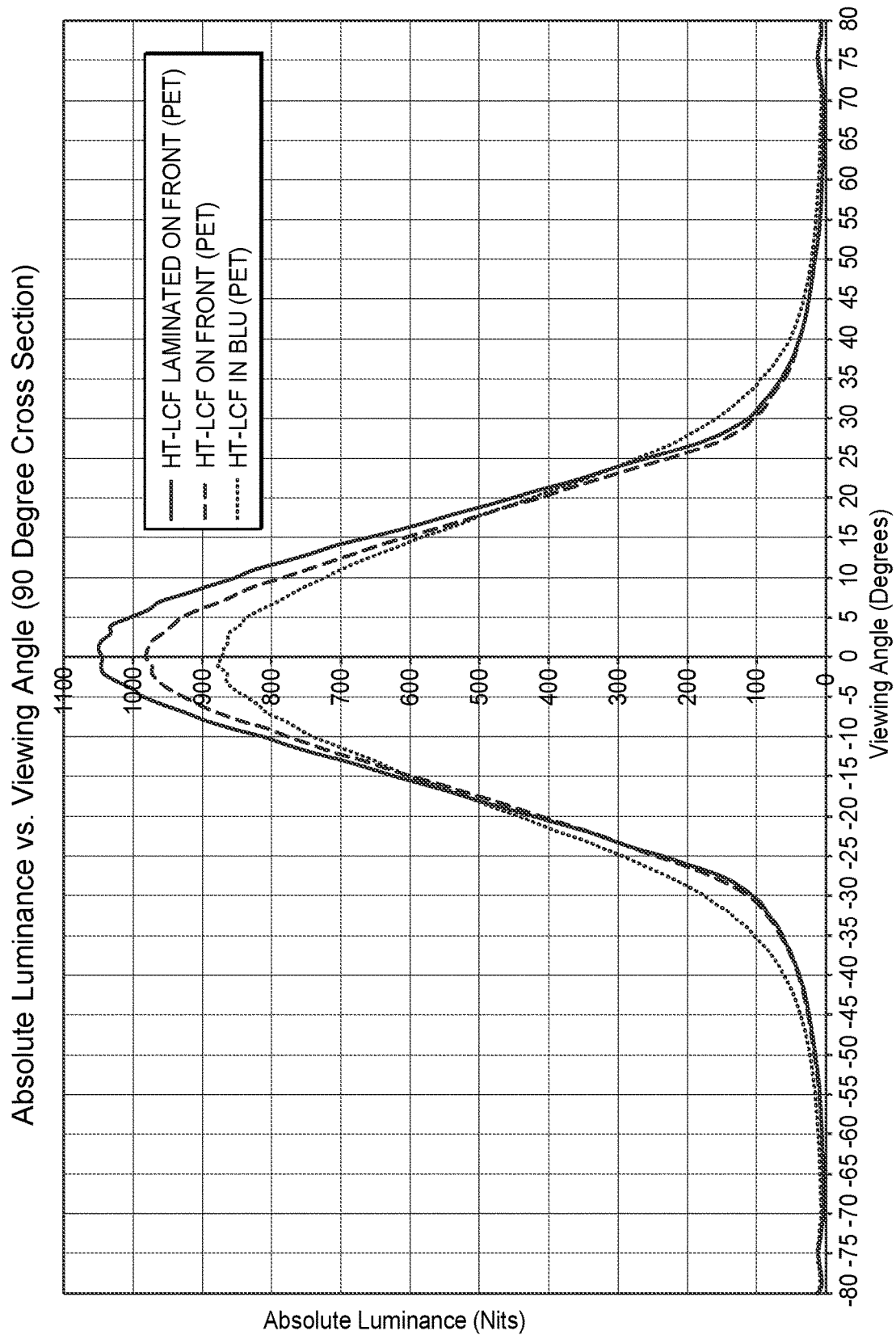
FIG. 13 is a plot of luminance versus viewing angle.
Figure 14:
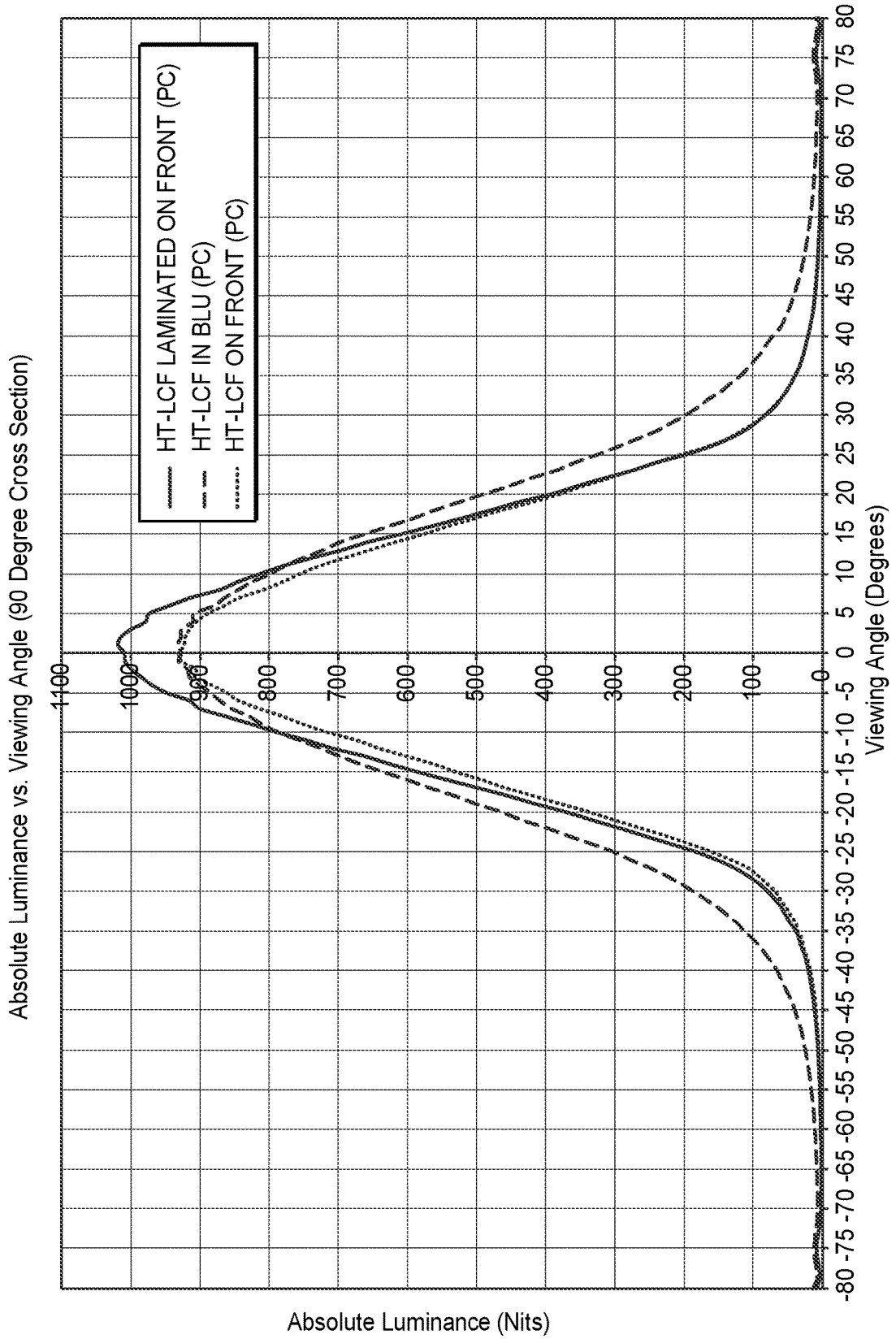
FIG. 14 is a plot of luminance versus viewing angle.

The results for luminance cross-section measurement for the PET type louver film are shown in FIG. 13 with results summarized in Table 6. The results for luminance cross-section measurement for PC type louver film are shown in FIG. 14 with results summarized in Table 7.

TABLE 6

Axial Luminance Results from PET type louver samples

| Example | Sample | Axial Luminance (Nits) | % Gain (relative to CE-2) |
|---|---|---|---|
| CE-2 | PC louver in BLU | 926.8 | — |
| Ex 3 | PC louver on Front | 930.5 | 0.4% |
| Ex 4 | PC louver laminated on LCD | 1009.1 | 8.9% |

The complete disclosures of the publications cited herein are incorporated by reference in

TABLE 7

Axial Luminance Results from PC Zion Samples

| Example | description | Axial Luminance (Nits) | % Gain (relative to CE-1) |
|---|---|---|---|
| CE-1 | PET louver in BLU | 870.4 | — |
| Ex 1 | PET louver on LCD | 980.5 | 12.7% |
| Ex 2 | PET louver laminated on LCD | 1044.2 | 20.0% | their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A display assembly comprising:
   a liquid crystal panel; and
   a light control film bonded to a view side of the liquid crystal panel by an optical adhesive, the light control film comprising:
   a light input surface and a light output surface opposite the light input surface, and
   alternating transmissive and absorptive regions disposed between the light input surface and the light output surface, wherein the absorptive regions have an aspect ratio of at least 30;
   wherein the optical adhesive comprises a diffusing optical adhesive comprising a polymeric matrix and polymeric particles comprising polymer beads, the diffusing optical adhesive bonding the light input surface of the light control film to the liquid crystal panel.

2. The display assembly of claim 1, wherein the diffusing optical adhesive has a clarity of less than 70% and a haze of less than 60%.

3. The display assembly of claim 1, wherein the duty cycle of the light control film is from 70% to 99.9%.

4. The display assembly of claim 1, wherein the diffusing optical adhesive is a pressure sensitive adhesive.

5. The display assembly of claim 1, wherein the diffusing optical adhesive is a structural adhesive.

6. An automotive display system, comprising the display assembly of claim 1 disposed behind a cover glass of the automotive display system.

7. The automotive display system of claim 6, further comprising a backlight, wherein the display assembly is disposed between the backlight and the cover glass of the automotive display system.

* * * * *